(12) United States Patent
Grady et al.

(10) Patent No.: US 6,553,629 B2
(45) Date of Patent: Apr. 29, 2003

(54) ILLUMINATED GRAB HANDLE ASSEMBLY

(75) Inventors: John E. Grady, Lombard, IL (US);
Dave Henke, Hawthorn Woods, IL (US); Kent Bach, Villa Park, IL (US)

(73) Assignee: Fleming Sales Company, Inc., Addison, IL (US)

( * ) Notice: Subject to any disclaimer, the term of this patent is extended or adjusted under 35 U.S.C. 154(b) by 63 days.

(21) Appl. No.: 09/793,295

(22) Filed: Feb. 26, 2001

(65) Prior Publication Data

US 2002/0116791 A1 Aug. 29, 2002

(51) Int. Cl.$^7$ .................................................. B60Q 1/00
(52) U.S. Cl. ........................ 16/444; 16/110.1; 16/903; 362/399
(58) Field of Search ................................ 16/444, 110.1, 16/903, DIG. 24; 362/399, 245, 577, 501; 74/543

(56) References Cited

U.S. PATENT DOCUMENTS

| | | | |
|---|---|---|---|
| 1,203,576 A | | 11/1916 | Broadhead |
| 1,523,495 A | * | 1/1925 | Silberman |
| 2,114,542 A | * | 4/1938 | Rydquist |
| 2,151,182 A | * | 3/1939 | Birdsall |
| RE21,512 E | * | 7/1940 | Creamer |
| 2,242,981 A | | 5/1941 | Pedersen |
| 2,308,844 A | * | 1/1943 | Wilshusen |
| 2,310,593 A | * | 2/1943 | Orlicki |
| 2,479,500 A | | 8/1949 | Longberg |
| D216,458 S | | 1/1970 | Nestrock |
| 3,569,689 A | * | 3/1971 | Nestrock |
| 3,707,016 A | * | 12/1972 | Smoot |
| 4,149,331 A | | 4/1979 | Prager |
| 4,231,077 A | | 10/1980 | Joyce et al. |
| 4,274,131 A | | 6/1981 | Praamsma |
| 4,356,592 A | * | 11/1982 | Moore |
| 4,394,718 A | * | 7/1983 | Balzer |
| 4,413,311 A | * | 11/1983 | Orenstein |
| 5,020,256 A | | 6/1991 | French |

(List continued on next page.)

FOREIGN PATENT DOCUMENTS

| | | |
|---|---|---|
| EP | 0 515 921 A2 | 12/1992 |
| GB | 1445843 | 8/1976 |
| JP | 406094922 | 4/1994 |
| JP | 11208277 | 1/1998 |

*Primary Examiner*—Anthony Knight
*Assistant Examiner*—Alison K. Pickard
(74) *Attorney, Agent, or Firm*—Wallenstein & Wagner, Ltd.

(57) ABSTRACT

The invention is an illuminated grab handle assembly. The assembly includes a generally curved handle, an illumination source positioned remotely from, and for illuminating, the generally curved handle. The illumination source provides the curved handle with a substantially uniform, fully illuminated appearance. The assembly also includes at least one base portion to which at least one end of the generally curved handle is secured. Mounting means secure the base portion to a mounting surface, and an opaque overcap covers the base portion and obscures the mounting means. The illuminated grab handle assembly includes either a single lamp or two lamps acting as the illumination source. The generally curved handle has a pair of ends. The portion of the generally curved handle between the pair of ends is both solid, and has a generally cylindrical cross section. Alternatively, this portion of the curved handle can be tubular. The ends of the curved handle include groove for securement to a keyway in the base portion. The overcap includes at least one tab, and the base portion includes at least one orifice. The tab in the overcap secures that overcap to the orifice in the base. The overcap has a bottom portion, and the width of the bottom portion of the overcap is wider than the width of the base. This permits the overcap to be press fit or snap fit onto the base.

11 Claims, 3 Drawing Sheets

U.S. PATENT DOCUMENTS

| | | | |
|---|---|---|---|
| 5,025,352 A | * | 6/1991 | Brown |
| 5,165,643 A | | 11/1992 | Shreiner |
| 5,193,786 A | | 3/1993 | Guenther |
| 5,288,048 A | | 2/1994 | Shreiner |
| 5,297,010 A | * | 3/1994 | Camarota et al. |
| 5,339,228 A | | 8/1994 | Baethge et al. |
| 5,396,740 A | | 3/1995 | Bocchi |
| 5,440,783 A | * | 8/1995 | Allardyce et al. |
| 5,692,822 A | | 12/1997 | Dreyer |
| 5,771,537 A | * | 6/1998 | Ho |
| 5,779,228 A | * | 7/1998 | Hansen |
| 5,913,671 A | * | 6/1999 | Fernandez et al. |
| 5,957,566 A | | 9/1999 | Chiu |
| 6,065,852 A | * | 5/2000 | Crumley |
| 6,135,621 A | | 10/2000 | Bach et al. |
| 6,164,805 A | * | 12/2000 | Hulse |
| 6,209,933 B1 | * | 4/2001 | Ang et al. |
| 6,290,040 B1 | * | 9/2001 | Chen |

* cited by examiner

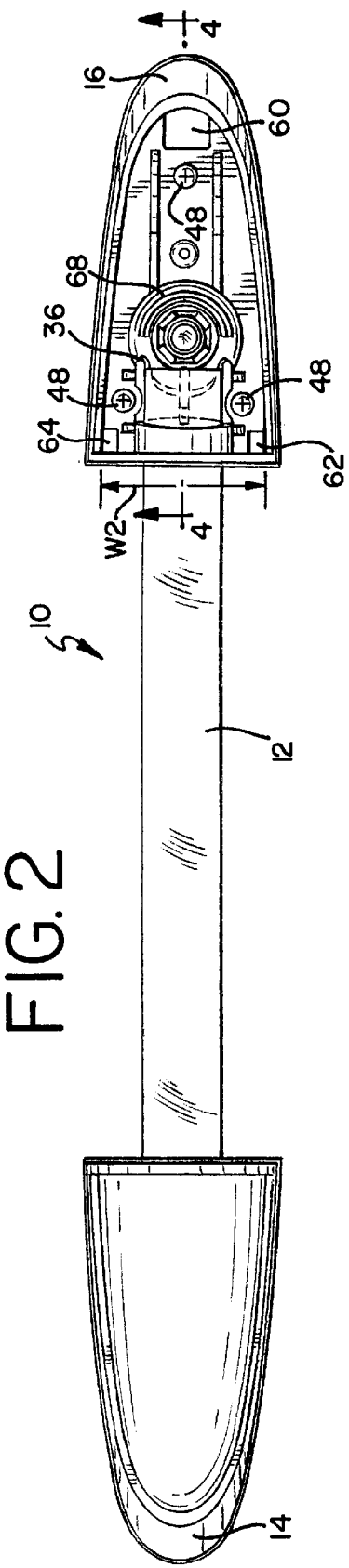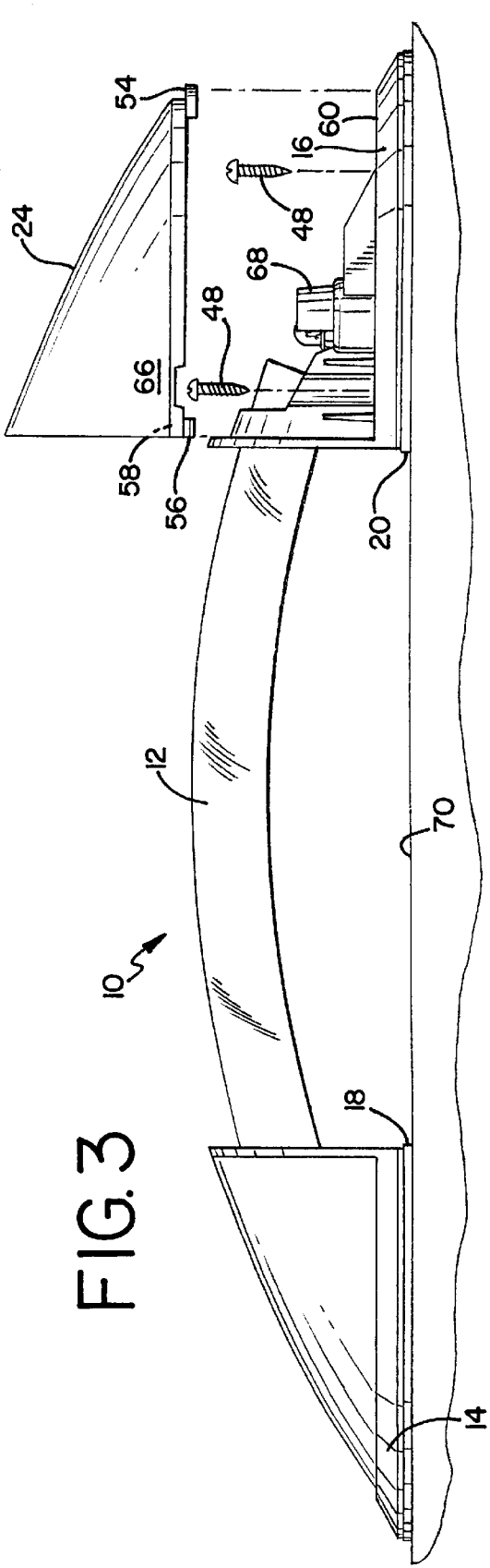

ILLUMINATED GRAB HANDLE ASSEMBLY

DESCRIPTION

1. Technical Field

This invention relates generally to a illuminated handle assembly that may be attached to any of several surfaces. The illuminated handle assembly may be used, as but one example, to assist in entering a vehicle.

2. Background of the Invention

Illuminated handles are well-known in the art. Among the illuminated handles disclosed in United States patents include U.S. Pat. Nos. 5,297,010 ("the '010 patent") and 5,025,352 ("the '352 patent"). While both of these illuminated handles are generally satisfactory for their intended purposes, they are not aesthetically pleasing because their means of connection, such as screws, are exposed when those handles are secured to a surface. For example, the '010 patent discloses a pair of screws that secure the handle to a surface. This is evidenced from column 3, lines 50–53, of the '010 patent: "(h)eads of the screws 18 are exposed through the exterior surface 10 of the member 1 for access by a tightening or loosening tool . . . " The use of the term "illuminated grab handle" to describe this invention is also somewhat misleading, in that the handle itself is apparently not illuminated. Instead, as indicated at column 3, lines 14–22, the light merely illuminates the wall behind the handle: "light from the light bulb . . . splashes on the vehicle wall W behind the grab handle 100. All that is seen is the splash of light emanating from behind the handle when the power is turned on. The splash of light extends laterally beyond the sides of the handle along the wall W. In this manner, the user can see the handle 100 at night by the light reflected from the wall W."

The '352 patent is directed to a lighted grab handle for trucks. The grab handle itself is apparently illuminated, but its mounting means, preferably screws or bolts, are highly visible when the grab handle is in use. See FIGS. 2 and 3 and column 2, lines 47–50 of the '352 patent, and see especially the visible bolts 30 in those two FIGURES.

Other generally relevant patents include U.S. Pat. Nos. 4,414,611; 5,528,468; 5,746,498; and 6,079,859 (referred to as either "the '611, the '468, the '498, and the '859 patent", respectively). The '611 patent is directed to a portable light having a housing which can be mounted onto a support surface. The device in the '611 patent includes a main housing section, a removable back, and a removable upper transparent cover. The housing has a stepped construction. This device is not, however, an illuminated handle.

The '468 patent is directed to an opera light for mounting upon either the "B" or "C" pillars of an automobile. The opera light of this invention is thin and flat, and thus cannot be grasped by the user to assist that user in entering or leaving a motor vehicle. Accordingly, this opera light cannot be fairly characterized as a grab handle.

Similarly, neither the '498 nor the '859 patents are directed to grab handles, but are instead directed to other kinds of automotive lamp assemblies. The '498 patent is directed to an auxiliary or third brake lamp, such as the center high mounted stop lamps (CHMSL) that have been mandated in cars sold in the United States since 1985. These CHMSLs may be installed inside of the car, such as upon the parcel shelf behind the rear seat and near the base of the rear window. Alternatively, the CHMSL may be mounted adjacent the top of the rear window, or upon the exterior surface of the car, near the trunk lid and directly in front of the rear window. The '859 patent is directed to an interior lamp assembly for an automobile, such as the assemblies used for interior roof mounted dome lights or side mounted interior reading lights.

SUMMARY OF THE INVENTION

The invention is an illuminated grab handle assembly. The device of the invention includes a generally curved handle. An illumination source is positioned remotely from the generally curved handle for illuminating the generally curved handle. The illumination source provides the curved handle with a substantially uniform, fully illuminated appearance. The assembly also includes at least one base portion. Mounting means are provided for securing the base portion to a mounting surface. Preferably, the mounting means comprises one or more screws. Furthermore, at least one end of the generally curved handle is secured to the base portion. An opaque overcap covers the base portion, and in this way obscures the mounting means.

In one embodiment of the invention, the illuminated grab handle assembly includes a single lamp acting as the illumination source. However, in a preferred embodiment, the grab handle assembly includes a pair of lamps, each one housed in a separate base portion, acting as the illumination source.

In the illuminated grab handle assembly of the invention, the generally curved handle has a pair of ends. The portion of the generally curved handle between the pair of ends is both solid and has a generally cylindrical cross section. Alternatively, the generally curved handle can be tubular, i.e., it can be shaped like a pipe, and made of an acrylic material. The ends of the curved handle include a groove. The groove is secured to a keyway in the base portion, for securement of the generally curved handle to this keyway. Securing the generally curved handle to the keyway acts to prevent rotational or lateral movement of the handle during use.

The overcap includes at least one tab, and the base portion includes at least one orifice. The tab in the overcap is secured the overcap to the orifice in the base.

The overcap has a bottom portion, and the width of the bottom portion of the overcap is wider than the width of the base. This permits the overcap to be compressed, permitting the overcap to be snapped securely into the base, and facilitating removal of the overcap.

BRIEF DESCRIPTION OF THE DRAWINGS

FIG. 2 is a top view of the entire assembly of FIG. 1, but with the overcap on the right side of the assembly removed.

FIG. 3 is a side view of the assembly of FIGS. 1 and 2.

DETAILED DESCRIPTION

This invention is susceptible of embodiment in many different forms. The drawings show and the specification describes in detail a preferred embodiment of the invention. It will be understood that the present disclosure is to be considered as an example of the principles of the invention. The disclosure is not intended to limit the broad aspect of the invention to the illustrated and described embodiments.

Figure 1:
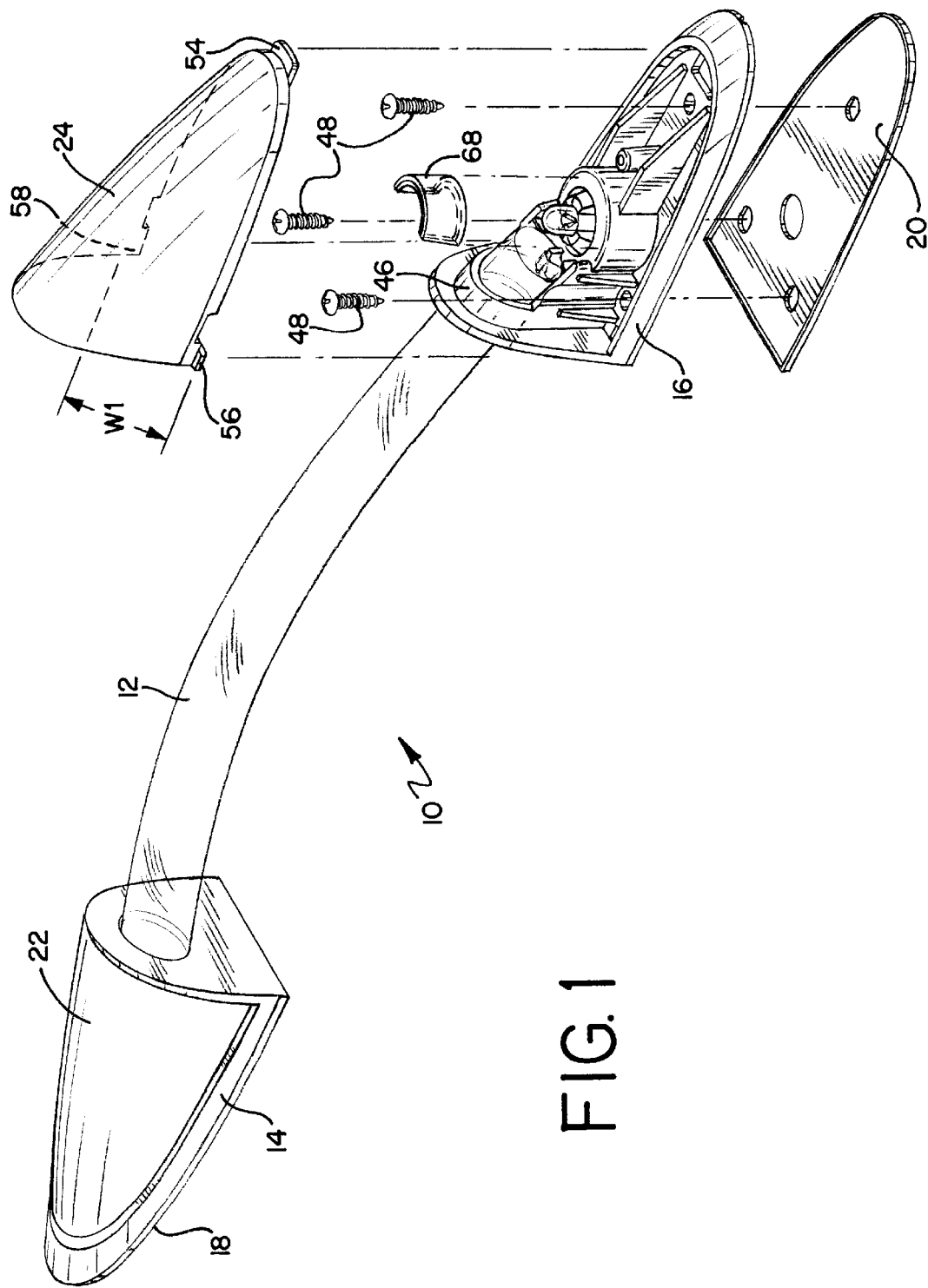
FIG. 1 is a perspective view of one preferred embodiment of the assembly of the invention, with the opaque overcap on the right side of the assembly shown in exploded view away from its base, and with the overcap on the left side of the assembly positioned to cover the base and the mounting means for the base portion.

FIG. 1 shows a perspective view of one preferred embodiment of the invention. As may be seen in this FIGURE, the invention is an illuminated grab handle assembly 10. The illuminated grab handle assembly 10 shown in this FIG. 1 is simple in its construction, comprising only seven main parts, plus the fasteners to secure the assembly to a mounting surface. The seven main parts include a generally curved handle 12; a pair of mirror image base portions 14 and 16; a pair of mirror image gaskets 18 and 20 that are placed between the base portions 14 and 16 and the surface to which the handle assembly 10 is to be mounted and secured; and a pair of mirror image overcaps 22 and 24 that are secured to the respective base portions 14 and 16.

Referring to FIGS. 1–4, the generally curved handle 12 is a clear, acrylic rod. It has a diameter of approximately one (1) inch, but may be of any suitable diameter. The curved handle 12 has a linear length L1, along a center line through the middle (see FIG. 5) of the handle, of approximately 11.75 inches. Of course, L1 may be of any suitable length. The radius R of curvature of this center line is approximately 17.50 inches. The radius of curvature may vary, depending upon the length of the generally curved handle 12. Instead, the handle could be substantially straight, with radiused ends.

Figure 4:
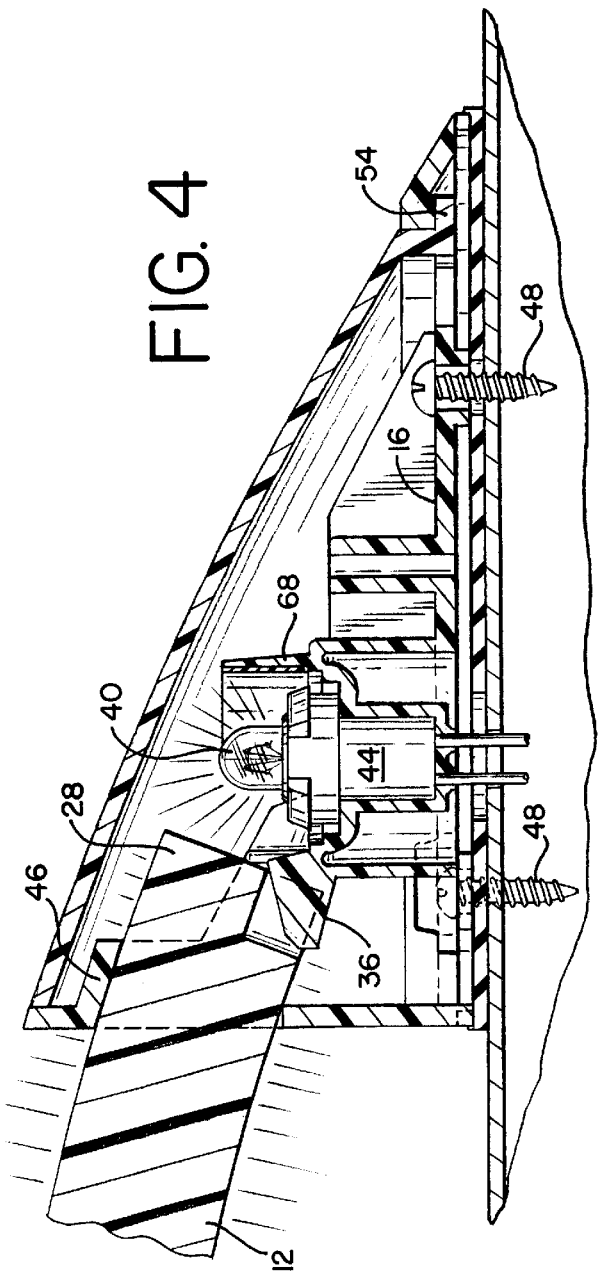
FIG. 4 is a cross-sectional, enlarged view of a portion of the right side of the assembly of FIG. 1, showing details of the base portion, and showing the assembly, with the cap in position, being illuminated by an incandescent light bulb or lamp.

FIG. 4 shows a cross-sectional view of the right side of the illuminated grab handle assembly. It should be understood that the left side of the illuminated grab handle assembly is a mirror image of the structure shown in FIG. 4, and is otherwise identical.

Figure 5:
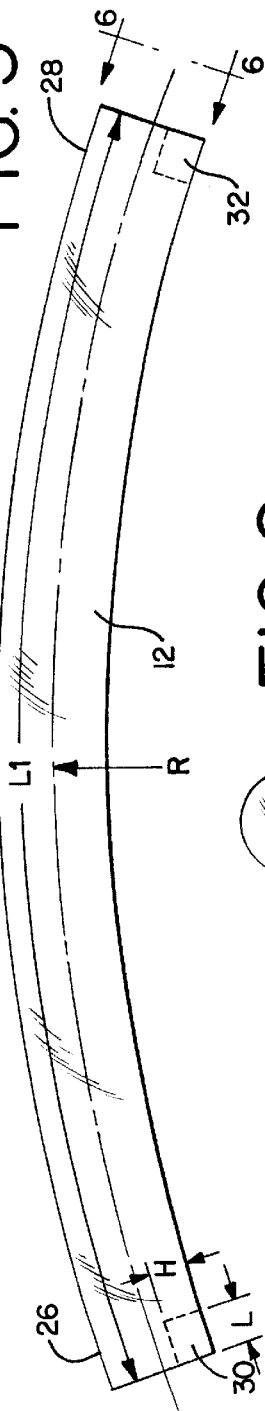
FIG. 5 is a side view of the generally curved handle of FIG. 1.
Figure 6:
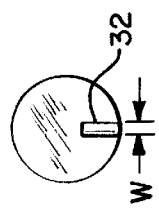
FIG. 6 is an end view, taken along lines 6—6 of FIG. 5, of the generally curved handle of FIG. 5.

As may best be seen in FIG. 5, the generally curved handle 12 has a pair of ends 26 and 28. The portion of the generally curved handle 12 between the pair of ends 26 and 28 is both solid, as may be seen in FIG. 6, and has a generally cylindrical cross section. Alternatively, the generally curved handle 12 may be tubular, and made of an acrylic material. As may be seen in FIGS. 5 and 6, each of ends 26 and 28 of the generally curved handle 12 include a groove 30 and 32. In this embodiment, each of these grooves 30 and 32 has a height H of 0.350 inch, a length L2 of 0.375 inch, and a width W of 0.125 inches. As may best be seen in FIGS. 4 and 6, the grooves 30 and 32 are engaged with a keyway 34 (not shown) and 36 in each of base portions 14 and 16. The interlocking engagement of the grooves 30 and 32 with the keyways 34 (not shown) and 36, respectively, ensures that the generally curved handle 12 is retained in a non-rotational and stable manner by the base portions 14 and 16. As the handle 12 and its grooves 30 and 32 are moved further onto the respective keyways 34 (not shown) and 36, additional interference creates a tighter fit between the handle 12 and the base portions 14 and 16. In addition, the movement of the grooves at the end of the handle 12 onto the keyways 34 (not shown) and 36 results in a tighter engagement between the top of the handle 12 and the bottom of the top of the sleeve 46, as can best be seen at the top of FIG. 4. This tighter engagement between the handle and the sleeve 46 also helps to inhibit rotation of the handle 12.

An illumination source is positioned remotely from the generally curved handle 12. This illumination source projects light through the handle 12. As depicted by projecting lines in FIG. 4, the illumination source provides the generally curved handle 12 itself with a substantially uniform, fully illuminated appearance. In other words, the illumination source provides the curved handle 12 with the appearance of a solid bar of light. This contrasts with at least one of the illuminated grab handles of the prior art, as described above, which projects light onto a wall behind the handle.

Preferably, the light is directed towards the handle 12, in order to prevent the unwanted dispersion of light away from that handle 12. Unwanted dispersion of light away from the handle 12 results in a less brightly illuminated handle 12. In order to concentrate the light towards the handle 12, a reflector 68 is provided. This reflector 68 is made of a fire retardant polypropylene having a white matte finish. The reflector 68 has an adhesive backing, permitting the reflector 68 to be adhered to the socket base that surrounds the bulb 40 and its holder. The use of this reflector 68 increases the light intensity in the handle 12 by an estimated 35%, as compared to an apparatus without the reflector 68. In FIG. 1, this reflector 68 is shown exploded upwardly away from the socket base that surrounds the bulb 40 and its holder.

While the assembly 10 must have at least one base portion, as noted above, the present embodiment includes two base portions 14 and 16. These two base portions 14 and 16 accommodate the two illumination sources, here two incandescent lamps 38 or LEDs (not shown) and 40, and a pair of conventional bulb or lamp sockets 42 (not shown) and 44. The bulbs 38 and 40 may be powered by either alternating current, direct current, through a hard-wired circuit, or by battery power. It is also understood that the invention may include, as an illumination source, one or more light-emitting diodes (LEDs).

As may be seen in FIG. 4, end 28 of generally curved handle 12 is secured to base portion 16. As shown in FIG. 1, a sleeve 46 is part of the molded base portion 16. The sleeve 46 has an inner diameter that is slightly larger than the one (1) inch diameter of the generally curved handle 12 and its end 28. The end 28 slides into the sleeve 46 and, as noted above, has a groove 32 that interlocks with the keyway 36.

Mounting means are provided for securing the base portions 14 and 16 to a mounting surface 50. Preferably, the mounting means comprises one or more sets of screws 48.

Opaque colored or translucent overcaps 22 and 24 cover the base portions 14 and 16. These overcaps 22 and 24 obscure the screws 48 or any other mounting means that secure the base portions 14 and 16 to the mounting surface. These overcaps 22 and 24 are preferably made of a grey acrylobutyl styrene (ABS). These unfinished ABS overcaps 22 and 24 may be plated or vacuum metallized with a thin chromium or gold plating.

As may best be seen in FIGS. 2, 3 and 4, overcap 24 includes at least one tab. In this embodiment, the overcap 24 includes three tabs 54, 56, and 58. The front tab 54 is secured to a corresponding orifice 60 at the tip of the base portion 16. The two side tabs 56 and 58 (not shown) become secured to orifices 62 and 64 at the sides of the base portion 16.

The overcap 24 has a bottom portion 66, and the width W1 of the bottom portion 66 (depicted in FIG. 1), including the tabs, of the overcap 24 is wider than the width W2 (FIG. 2) of the base portion 16. As a result of this construction, the overcap 24 may be press fit or snap fit onto the base portion 16. Particularly, in order to place the overcap 24 onto the base portion 16, the user grips the bottom portion 66 of the overcap 24 directly above tabs 56 and 58, respectively. The overcap 24 is squeezed inwardly to effectively compress and thereby reduce the width W1 of the back end of the overcap 24. The front tab 54 is then angled into engagement with its corresponding orifice 60. While maintaining squeezing pressure upon the back end of the overcap 24, tabs 56 and 58 are lowered towards their corresponding orifices 62 and 64. When the tabs 56 and 58 are positioned adjacent the orifices 62 and 64, the pressure imposed upon the overcap 24 by the thumb and forefinger is released. The tabs 56 and 58 then spring into a locking engagement with orifices 62 and 64. Removal of the overcap 24 from the base portion 16 is the reverse of installation.

The overcap 24 may be removed to gain access to and permit replacement of the incandescent lamp or LED 40. If the bulbs 38 and 40 are powered by batteries rather than direct or alternating current, these batteries may be placed below the overcap 24. Access to the batteries is obtained by removal of the overcap 24.

Specific embodiments have been illustrated and described. Numerous modifications are possible, without significantly departing from the spirit of the invention. Therefore, the scope of protection is only limited by the scope of the accompanying claims.

We claim:

1. An illuminated grab handle assembly, comprising: (a) a generally curved handle; (b) an illumination source positioned remotely from said generally curved handle for illuminating said generally curved handle and providing said curved handle with a uniform, fully illuminated appearance; (c) at least one base portion to which at least one end of said generally curved handle is secured; (d) mounting means for securing said base portion to a mounting surface; and (e) an opaque overcap covering said base portion and obscuring said mounting means, wherein said generally curved handle has a pair of ends and the portion of said generally curved handle between said pair of ends is solid.

2. The illuminated grab handle assembly of claim 1, wherein said mounting means comprises one or more screws.

3. The illuminated grab handle assembly of claim 1, wherein a single lamp acts as the illumination source.

4. The illuminated grab handle assembly of claim 1, wherein a pair of lamps acts as the illumination source.

5. The illuminated grab handle assembly of claim 1, wherein the portion of said generally curved handle between said pair of ends has a generally cylindrical cross section.

6. The illuminated grab handle assembly of claim 1, wherein a groove at each of said ends of said generally curved handle secures said generally curved handle to a keyway in said base portion.

7. The illuminated grab handle assembly of claim 1, wherein said overcap includes at least one tab, and wherein said base portion includes at least one orifice, and wherein said at least one tab secures said overcap to said at least one orifice in said base.

8. The illuminated grab handle assembly of claim 1, wherein said overcap has a bottom portion, and wherein the width of the bottom portion of the overcap is wider than the width of the base, permitting said overcap to be press fit onto said base.

9. The illuminated grab handle assembly of claim 1, wherein the portion of said generally curved handle between said pair of ends is tubular and has a generally cylindrical cross section.

10. The illuminated grab handle assembly of claim 1, wherein said assembly includes a reflector for reflecting light primarily towards said generally curved handle.

11. The illuminated grab handle assembly of claim 10, wherein said reflector includes an adhesive backing, permitting said reflector to be adhered to a portion of said assembly.

* * * * *